Patented Feb. 21, 1939

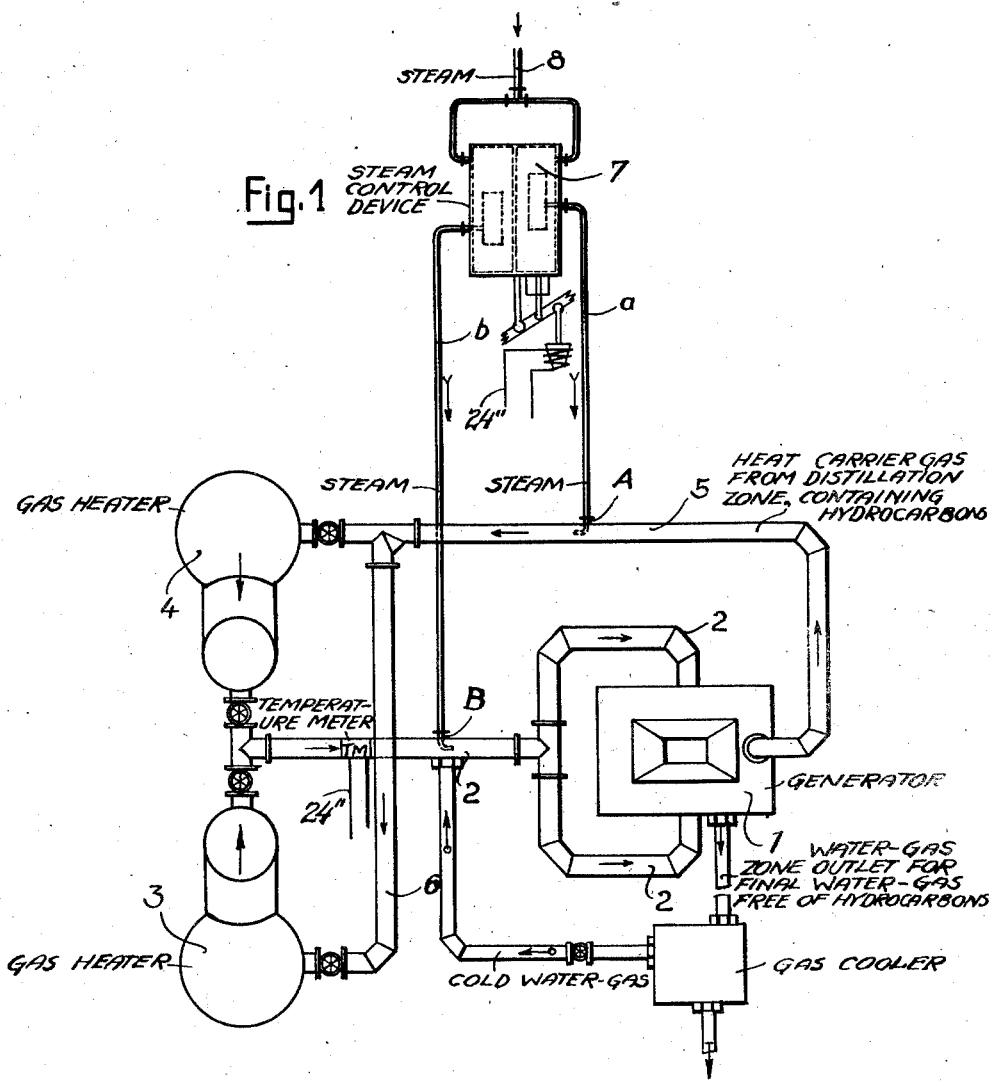

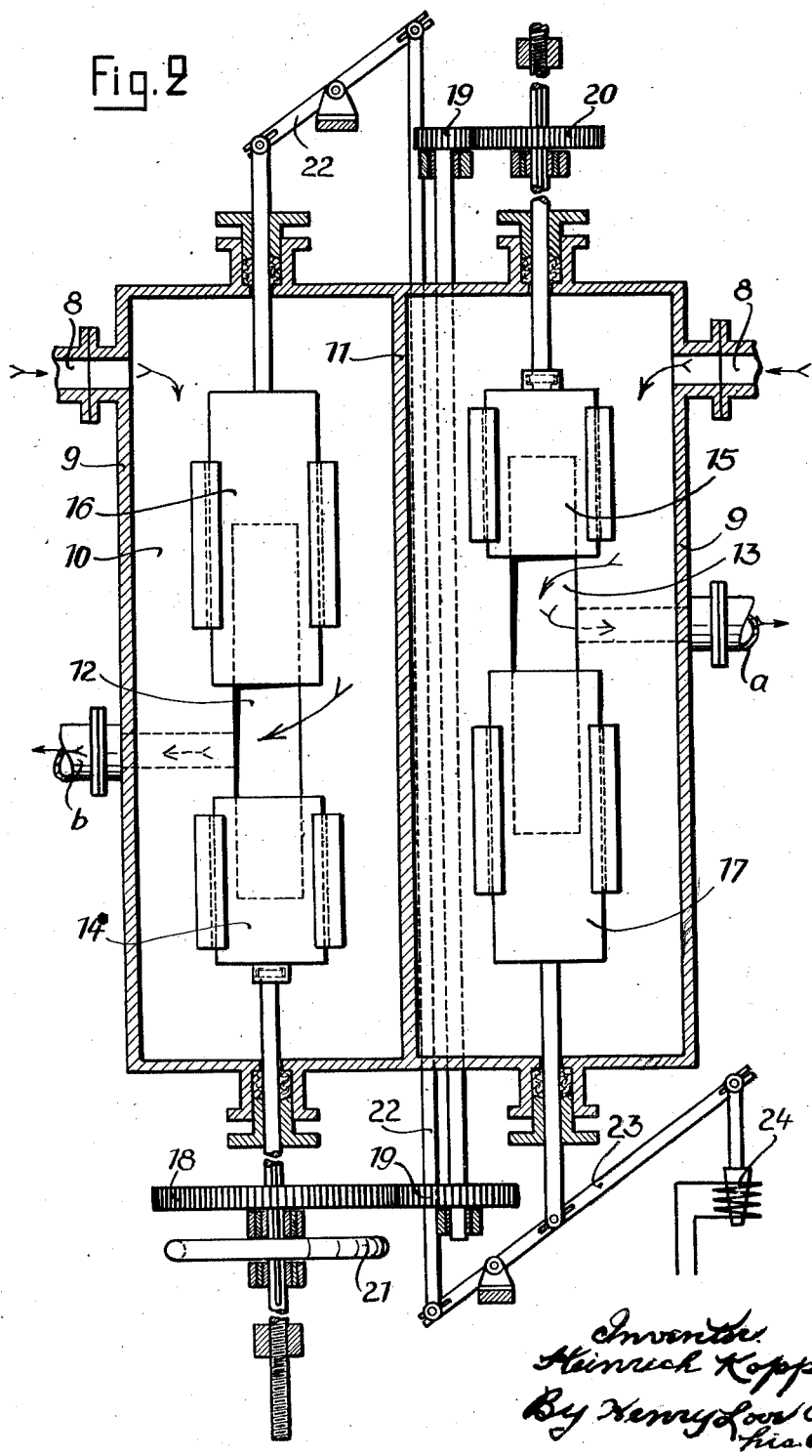

2,148,299

UNITED STATES PATENT OFFICE 2,148,299

CONTINUOUS PRODUCTION OF WATER GAS

Heinrich Koppers, Essen, Germany, assignor, by mesne assignments, to Koppers Company, Pittsburgh, Pa., a corporation of Delaware Application July 10, 1937, Serial No. 152,910
In Germany July 13, 1936

5 Claims. (Cl. 48—202)

The invention relates to the continuous production of water-gas by means of a heat carrying stream which is circulated through a shaft-like producer, preferably passes downwardly through the fuel to be treated, and a heater; said gas stream consisting in part of the water-gas produced and/or other gases and being brought into contact with the fuel in the producer, together with the steam needed for the production of water-gas.

The principle object of the present invention consists in producing continuously water-gas of a definite composition from solid fuels, especially bituminous fuels.

More recently, the production of water-gas, especially water-gas of the composition necessary for the synthesis of hydrocarbons by the catalytic decomposition of carbon monoxide and hydrogen, become of utmost importance. A water-gas containing carbon monoxide and hydrogen in the proportion of 1:2 is required for the synthesis of hydrocarbons from carbon monoxide and hydrogen. It is very essential that such a water-gas (often called synthesis gas) be freed from hydrocarbons, especially those hydrocarbons which tend to polymerise with the formation of gum-like constituents. These constituents precipitate on the surface of the catalysts for the hydrocarbon synthesis, which causes these catalysts to become ineffective. Especially when dealing with bituminous fuels, such as brown coal,—briquettes, dangerous hydrocarbons are produced during the low-temperature distillation of the fuel and mingle with the gaseous heat carrier gas.

It has now been found, that with the above process of continuous production of water-gas, it is also possible to produce such water-gas from bituminous fuels which water-gas is completely or nearly free from hydrocarbons. The heat carrying gas is brought to a high-temperature of say 125° C. in the presence of steam, before entering the gas producer. At such temperatures the hydrocarbons react with steam with the formation of hydrogen and carbon monoxide, e. g. methane will react according to the following equation: $CH_4 + H_2O = CO + 3H_2$. In addition to the same, free carbon is made in graphite form.

If a heat carrying gas, freed from hydrocarbons in this manner is introduced into the fuel in the producer and if the water-gas produced therefrom is withdrawn from a zone of the producer in which the degasification (distillation) of the fuel charge is already completed, a water-gas will be obtained which is completely or nearly free of said dangerous hydrocarbons. A portion of the heat carrying gas, after it has given-off its heat to the fuel bed for the formation of water-gas, is then led in a cycle through the fresh fuel charge of the gas producer and gives up further heat for the degasification of the fuel. The heat carrying gas thereby takes-up the hydrocarbons produced from the bituminous matter of the fuel and also other constituents. After a suitable purification, the heat carrying gas stream, together with steam, again enters the heater where the hydrocarbons are converted into carbon, carbon monoxide and hydrogen, as already described above.

The composition of the water-gas depends upon the temperature of the water-gas reaction and the reactivity of the fuel. Being provided with a fuel of a definite reactivity, the content of carbon monoxide in the water-gas will increase with an increase in the reaction temperature. If, for instance, the above-mentioned synthesis gas is to be produced, the carbon monoxide content of the gas is not allowed to exceed a certain degree. For the production of synthesis gas, the heat carrying gas stream therefore has to be of a definite temperature when entering the fuel charge of the gas producer, and said temperature may not be subjected to a considerable variation in order that the composition of the gas shall not be altered disadvantageously. When dealing, for instance, with brown coal, or with coke produced during the low-temperature distillation of brown coal, it is preferable that the heat carrying gas shall have a temperature of about 1050° C. and that the useful gas be withdrawn from the gas producer at a temperature of about 700° C.

The water-gas is therefore produced within temperature range between 700 and 1050° C. Now, the temperature of 1050° C. is essentially lower than the temperature to which the heat carrying stream of gas must be raised within the gas heater, for the purpose of a complete destruction of the dangerous hydrocarbons. Therefore, it has hitherto not been possible to produce a synthesis gas by the above continuous water-gas process, which, on the one hand, is completely free from hydrocarbons and, on the other hand, possesses carbon monoxide and hydrogen in the prescribed proportion. The different temperatures of the ranges, as shown by the above examples, are, of course, not binding for other fuels and other gas compositions.

Further difficulties are caused in the heating-up stage for heating the heat carrying gas of the process during the production of synthesis gas, or of a water-gas used for other purposes which also has to be of a certain uniform composition, in that the temperature of the regenerators, serving as the gas heaters is subjected to considerable variations in temperature as the regenerative phase ages or progresses during the water-gas operation period.

By choosing shorter reversing periods, these variations or drops in temperature can be kept within a so-called "not dangerous range", but in doing so the costs for the production of water-gas are considerably increased, due to the shortening of the reversals periods, as the time of producing the water-gas has to be interrupted for a certain time, e. g. for 2–3 minutes for a large-scale plant, in order to reverse the shut-off valves and to expel the waste gases from the gas heater by means of steam to urge the same. The consumption of steam required for expelling the waste-gases, is fairly high. From this it will be seen that it is more economical to operate with reversing periods that are as long as possible, and then to reverse the regenerators for the production of synthesis gas, only if the temperature falls below the point at which the conversion of hydrocarbons begins to become incomplete.

In order to overcome the difficulties mentioned in the foregoing, the present invention now makes provisions to divide the steam to be added to the heat carrying gas stream, preferably into two streams, which may be controlled separately, of which one stream is added to the heat-carrying gas before entering the heater, and the other stream to the hot heat carrying gas after leaving the gas heater, whereby, if necessary, the quantity of steam is altered in both streams, during the operation, so that independently of the operating temperature prevailing in the gas heater, the stream of heat carrying gas always enters the fuel charge of the producer gas, at a uniform temperature.

According to the invention, the quantity of steam added in both streams can be controlled automatically by suitably coupled reversing valves, which separately control the steam quantity in both streams and which are governed by a temperature meter, provided in the path of heat carrying gas stream leading to the entrance of the gas generator.

By making use of the present invention, it is also possible to adjust the temperature of the heat carrying gas stream quite independently of the heating to which the heat carrying gas stream is subjected to in the heater, when certain constituents are converted. The invention, therefore, offers the possibility of producing for instance from bituminous fuels, a synthesis gas which is completely free from dangerous hydrocarbons and in which the gas is maintained at a predetermined certain definite proportion as regards the content of carbon monoxide, carbon dioxide and hydrogen, without causing in practical operation any disadvantageous variations in the composition of this gas. The advantages resulting from the further treatment of the synthesis gas for the synthesis of hydrocarbons are very obvious. Due to the uniform composition of the synthesis gas obtained in my process, it is now possible to produce hydrocarbons having a definite composition in the synthesis plant, and to avoid such undesired reactions, on the catalysts as were hitherto often observed on account of the said variations in the gas composition.

A further object of my present invention makes provisions for improvements whereby the temperature of the heat carrying gas stream can also be controlled in the event that the steam added to the heat carrying gas is not sufficient to attain the required reduction of temperature, even though the whole quantity of steam is added to the heat carrying gas circulating between the heater and the gas generator.

For such special instances, the invention provides for adding a portion of cold water-gas to the heat carrying gas, circulating between the heater and gas generator. The cold water-gas originates from the water-gas zone of the gas generator and is subjected to a suitable cooling-down before being admixed with the hot heat carrier gas.

If the process is carried out according to this feature of my invention, it is not only possible to adjust the temperature of the heat carrying gas stream independent of the temperature existing in the heater, but also to adjust the temperature to the desired degree quite independently of the quantity of the steam to be added. Moreover, the process according to the invention is also of advantage if a part of the steam is introduced into the heat carrying gas stream before the heater, not taking into consideration the addition of cold gas. The presence of large quantities of steam in the heat carrying gas stream flowing through the heater assures a good decomposition of the dangerous hydrocarbons with the formation of carbon monoxide and hydrogen.

Another advantageous utilization for the present invention is the production of water-gas, containing not much carbon monoxide, but more hydrogen and carbon dioxide. It is well-known, that such a gas may be converted easily into hydrogen, nearly free from any impurities, in that the residual quantity of carbon monoxide is reduced into carbon dioxide, whereupon the whole quantity of carbonic acid is extracted in the well-known manner.

In order to produce a water-gas, rich in hydrogen and carbon dioxide, and poor in carbon monoxide, the temperature for the formation of water-gas when dealing with brown coal—coke must be at about 900° C. If the heat carrying gas is brought to a temperature of say 1250° C., in the gas heater, the hydrocarbons contained in the heat carrying gas are converted and it is necessary to reduce the temperature of the heat carrying gas stream, circulating between gas heater and gas generator, by about 350° C. This range of temperature is so great, that often it may not be reduced to the desired extent except by the addition of steam. By making use of the described, modified process, according to the invention, it is easily possible to reduce the temperature within the desired degree.

Finally, my process is of advantage in cases when no steam from other sources is added to the heat carrying gas or when for any reason the whole quantity of steam has to be added to the heat carrying gas stream before it enters the heater. Then, the addition of cold water-gas may be used for reducing the high temperature at which the heat carrying gas leaves the gas heater, or the addition of cold gas may only serve to equalise the variations in temperature to which the stream of heat carrying gas is subjected, if regenerators are used as gas heaters during one operating period.

In order that this invention may be more readily understood and carried into practice, reference is hereby made to the accompanying drawings, showing the scheme of a plant, suitable for carrying out the process according to the invention.

Figure 1 shows a schematic plan view of the apparatus for carrying out the process according to the invention.

Figure 2 illustrates the controlling device, necessary for the gasification of the partial gas streams.

The water-gas generator 1 illustrated in Figure 1 is charged with a bituminous fuel, brown coal briquettes. The heated carrying gas is introduced from below into the synthesis gas generator through pipeline 2. The pipeline 2 is for this reason connected with the gas heaters 3 and 4, by suitable interconnecting shut-off valves.

The heat carrying gas which is introduced into the gas heater through pipelines 5, 6 is withdrawn from the top of the gas generator 1.

The pipeline 5 is fitted with a steam pipe A and the pipeline 2 with a steam pipe B. These pipes A and B are so constructed that the steam introduced into the pipelines is well mixed with the gases contained therein. Steam is added into the steam pipes A and B through pipelines $a$ and $b$. The pipe lines A and B lead to a control device 7, to which the main steam pipeline 8 is connected.

The construction of the device 7 is fully detailed in Figure 2. The device consists of a casing 9, which is fitted with a horizontal partition bottom 10 and a middle vertical partition wall 11. The intermediate portion of the bottom 10 is provided with two slots 12 and 13. The steam pipes $a$ and $b$ lead off from the space underneath the partition bottom 10.

The slots 12 and 13 are controlled by valves 14, 15, 16 and 17. The valves 14 and 15 are interconnected by the tooth-wheel 18, pinion shaft 19 and the tooth wheel 20 in such a way that they can be operated by a common form of hand-wheel 21. The fundamental regulation of the free section of the slots 12 and 13 is done by means of valves 14 and 15.

The valves 16 and 17 are interconnected by means of rods 22, so that for instance the valve 16 is closed when the valve 17 is opened. The adjusting arm 23 of the rods 22 is for instance further connected with an electromagnetically operable device 24, which is controlled through leads 24 by a corresponding temperature meter 24', which is suitably arranged within the pipeline 2 for the heated gas carrying stream to measure the temperature of the gas after it has left the gas heater but before it enters the gas generator.

The steam is introduced through the pipeline 8 into the control device, said pipeline being connected to both compartments of the controlling device. If necessary, it is, of course, also possible to eliminate the partition wall 11 in the upper part of the device and to distribute the steam from the pipeline 8 into the slots 12 and 13.

I have now described my present invention on the lines of a preferred embodiment thereof, but my invention is not limited in all its aspects to the mode of carrying it out as described and shown, since the invention may be variously embodied within the scope of the following claims.

I claim:—

1. In a method of continuously producing water-gas of a predetermined definite composition uniformly with respect to its ratio of hydrogen, carbon dioxide, and carbon monoxide and free of hydrocarbons, from distillable solid fuels, which comprises: maintaining in a bed of continuously descending fuel aforesaid a water-gas reaction zone in which the distillation of the fuel thereof is already completed and a predistillation zone therefor, and withdrawing the hydrocarbon free water-gas from the zone of the fuel bed in which predistillation of the fuel is already completed; and effecting said maintenance of the zones of the fuel bed by traversing the distillation zone with a preheated gaseous heat carrier medium of water-gas and steam and circulation of the medium from the distillation zone together with the hydrocarbons therefrom through a separate gas heating-up stage and thence back to the fuel bed through the water-gas reaction zone; adding steam to the heat carrier medium for the water-gas reaction in fuel bed and for converting the hydrocarbons contained in the heat carrier medium into carbon monoxide and hydrogen in the heating-up stage; and heating the heat carrier medium in the heating-up stage to the temperature critical to convert the hydrocarbons; the improvement comprising cooling the heat carrier medium, after it issues from the heating-up stage but before it enters the water-gas reaction stage fuel bed, down to at least the upper limit of the temperature range critical for producing a gas of predetermined definite composition uniformly with respect to its ratio of $H+CO+CO_2$ from the particular fuel being gasified by the heat carrier medium in the fuel bed.

2. A method as claimed in claim 1, and in which the cooling is effected by adding part of the steam that is to be added to the heat carrier medium for the water-gas reaction in the fuel bed of the process, to the heat carrier medium, after the medium leaves the heating-up stage but before it enters the fuel bed, and in amounts sufficient to cool the medium down from its higher temperature for conversion of the hydrocarbons to the lower temperature of the upper limit of the critical temperature range required of the fuel for uniformly producing the definite ratio of $H+CO+CO_2$.

3. A method as claimed in claim 1, and in which the cooling is effected by adding part of the steam that is to be added to the heat carrier medium for the water-gas reaction in the fuel bed of the process, to the heat carrier medium, after the medium leaves the heating-up stage but before it enters the fuel bed, and in amounts sufficient to cool the medium down from its higher temperature for conversion of the hydrocarbons to the lower temperature of the upper limit of the critical temperature range required of the fuel for uniformly producing the definite ratio of $H+CO+CO_2$, and in which the amount of steam so added is reduced in proportion to the drop in temperature of the heat carrier medium, as the heating-up stage becomes reduced in temperature, so that the heat carrier medium is always cooled to the same temperature by the addition of the steam for cooling.

4. A method as claimed in claim 1 and in which the cooling is effected by adding to the heat carrier medium, after it leaves the heating-up stage but before it enters the fuel bed, a portion of the steam that is to be added as aforesaid to the heat carrier for the water-gas reaction in the fuel bed of the process, and a cooled portion of the water-gas drawn off from the aforesaid zone of the fuel bed in which predistillation of the fuel is already completed, and in amounts sufficient to together cool the heat carrier medium down from its higher temperature for conversion of the hydrocarbons to the lower temperature of the upper limit of the critical temperature range required of the fuel for uniformly producing the definite ratio of $H+CO+CO_2$.

5. A method as claimed in claim 1, and in which the cooling is effected by adding to the heat carrier medium, after it leaves the heating-up stage but before it enters the fuel bed, a cooled portion of the water-gas drawn off from the aforesaid zone of the fuel bed in which predistillation of the fuel is already completed, and in amounts sufficient to cool the heat carrier medium down from its higher temperature for conversion of the hydrocarbons to the lower temperature of the upper limit of the critical temperature range required of the fuel for uniformly producing the definite ratio of $H+CO+CO_2$.

HEINRICH KOPPERS.